United States Patent
Chen et al.

(10) Patent No.: US 12,008,171 B2
(45) Date of Patent: Jun. 11, 2024

(54) PROGRAM DOWNLOAD METHOD FOR INTELLIGENT TERMINAL WITH MEMORY CARD IDENTIFIER AND INTELLIGENT TERMINAL WITH MEMORY CARD IDENTIFIER

(71) Applicant: SPREADTRUM COMMUNICATIONS (SHANGHAI) CO., LTD., Shanghai (CN)

(72) Inventors: Lele Chen, Shanghai (CN); Jianhua Zheng, Shanghai (CN)

(73) Assignee: SPREADTRUM COMMUNICATIONS (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 18/021,870

(22) PCT Filed: Aug. 20, 2021

(86) PCT No.: PCT/CN2021/113843
§ 371 (c)(1),
(2) Date: Feb. 17, 2023

(87) PCT Pub. No.: WO2022/037686
PCT Pub. Date: Feb. 24, 2022

(65) Prior Publication Data
US 2023/0315213 A1 Oct. 5, 2023

(30) Foreign Application Priority Data
Aug. 20, 2020 (CN) .......................... 202010844023.6

(51) Int. Cl.
*G06F 3/02* (2006.01)
*G06F 9/445* (2018.01)
*G06F 13/40* (2006.01)

(52) U.S. Cl.
CPC ............ *G06F 3/02* (2013.01); *G06F 9/44505* (2013.01); *G06F 13/4068* (2013.01)

(58) Field of Classification Search
CPC .... G06F 3/02; G06F 9/44505; G06F 13/4068; G06F 13/387; G06F 13/10;
(Continued)

(56) References Cited

U.S. PATENT DOCUMENTS

2002/0069353 A1* 6/2002 Smith ................... G06F 9/4411
713/1
2005/0193390 A1 9/2005 Suzuki et al.
(Continued)

FOREIGN PATENT DOCUMENTS

CN 101344907 A 1/2009
CN 101937349 A 1/2011
(Continued)

OTHER PUBLICATIONS

Nov. 24, 2021 International Search Report issued in International Patent Application No. PCT/CN2021/113843.
(Continued)

*Primary Examiner* — Richard J Hong
(74) *Attorney, Agent, or Firm* — Harness, Dickey & Pierce, P.L.C.

(57) ABSTRACT

Disclosed in the present invention are a program download method for an intelligent terminal and an intelligent terminal. The program download method for an intelligent terminal comprises the following steps: identifying a memory card identifier of an intelligent terminal, the memory card identifier being used for representing the type of a memory card of the intelligent terminal; obtaining a target configuration file, the target configuration file being a configuration file corresponding to the memory card identifier; and downloading the target configuration file to the intelligent termi-
(Continued)

nal. In the present invention, the type of the memory card of the intelligent terminal can be automatically identified, such that the corresponding target configuration file is automatically obtained according to the type of the memory card so as to configure the intelligent terminal, and thus, the intelligent terminal can normally access the memory card. This solution achieves effective and accurate download configuration.

10 Claims, 1 Drawing Sheet

(58) Field of Classification Search
CPC .. G06F 13/4022; G06F 3/0688; G06F 9/4411; G06F 12/0238; G06F 3/0679; G06F 13/102; G06K 7/10297; G05B 19/0426
See application file for complete search history.

(56) References Cited

U.S. PATENT DOCUMENTS

| | | | | |
|---|---|---|---|---|
| 2005/0251593 | A1* | 11/2005 | Lin | G06K 7/10297 710/62 |
| 2008/0126628 | A1* | 5/2008 | Mullis | G06F 9/4411 710/63 |
| 2011/0072185 | A1* | 3/2011 | Pinto | G06F 13/387 710/316 |
| 2013/0282959 | A1 | 10/2013 | Chu | |
| 2015/0143022 | A1* | 5/2015 | Shacham | G06F 12/0238 711/103 |
| 2015/0356040 | A1* | 12/2015 | Shin | G06F 13/4022 711/115 |
| 2016/0274821 | A1* | 9/2016 | Park | G06F 13/102 |
| 2017/0199673 | A1* | 7/2017 | Park | G06F 3/0688 |
| 2018/0024962 | A1* | 1/2018 | Lee | G06F 3/0679 710/106 |
| 2019/0146934 | A1* | 5/2019 | Rosensprung | G05B 19/0426 710/105 |
| 2020/0201654 | A1* | 6/2020 | Wang | G06F 13/10 |

FOREIGN PATENT DOCUMENTS

| | | |
|---|---|---|
| CN | 102736859 A | 10/2012 |
| CN | 109426625 A | 3/2019 |
| CN | 111177068 A | 5/2020 |

OTHER PUBLICATIONS

Jan. 9, 2023 Written Opinion of the International Searching Authority issued in International Patent Application No. PCT/CN2021/113843.
May 6, 2022 First Chinese Office Action issued in Chinese Priority Application No. 202010844023.6.
Apr. 27, 2022 Chinese Search Report issued in Chinese Priority Application No. 202010844023.6.
Sep. 26, 2022 Second Chinese Office Action issued in Chinese Priority Application No. 202010844023.6.

* cited by examiner

PROGRAM DOWNLOAD METHOD FOR INTELLIGENT TERMINAL WITH MEMORY CARD IDENTIFIER AND INTELLIGENT TERMINAL WITH MEMORY CARD IDENTIFIER

CROSS-REFERENCE TO RELATED APPLICATIONS

The present application is a U.S. National Phase Application under 35 U.S.C. 371 of International Application No. PCT/CN2021/113843, filed on Aug. 20, 2021, which claims priority to Chinese Patent Application No. 202010844023.6 filed on Aug. 20, 2020, the content of which is incorporated herein by reference in its entirety.

TECHNICAL FIELD

The present disclosure belongs to the technical field of program downloading for intelligent terminals, and particularly relates to a program download method for an intelligent terminal and an intelligent terminal.

BACKGROUND

Memory cards used by intelligent terminals such as mobile phones include an embedded multimedia card (eMMC card) and a universal flash storage (UFS) card. Generally, when an intelligent terminal is produced in mass production, either the eMMC card or the UFS card is supported. It is very inconvenient to provide separate software for the maintenance of the UFS and eMMC. In addition, it is inefficient to download a special software version to the intelligent terminal for the memory card supported by the intelligent terminal.

CONTENT OF THE PRESENT INVENTION

The present disclosure aims to solve the technical problem in the prior art that it is inefficient to download a special software version to the intelligent terminal for the memory card supported by the intelligent terminal, and provides a program download method for an intelligent terminal and an intelligent terminal.

The present disclosure solves the technical problem described above through the following technical solutions.

The present disclosure provides a program download method for an intelligent terminal, which comprises:
identifying a memory card identifier of the intelligent terminal, the memory card identifier being used for representing a type of a memory card of the intelligent terminal;
obtaining a target configuration file, the target configuration file being a configuration file corresponding to the memory card identifier; and
downloading the target configuration file to the intelligent terminal.

According to the technical solution, the type of the memory card of the intelligent terminal can be automatically identified, such that the corresponding target configuration file is automatically obtained according to the type of the memory card so as to configure the intelligent terminal, and thus, the intelligent terminal can normally access the memory card. This solution achieves effective and accurate download configuration and improves the efficiency.

Preferably, the intelligent terminal is provided with a dial switch, the type of the memory card of the intelligent terminal is a first type when the dial switch is at a first position, and the type of the memory card of the intelligent terminal is a second type when the dial switch is at a second position;
said identifying a memory card identifier of the intelligent terminal comprises:
identifying a position of the dial switch;
said obtaining a target configuration file comprises:
taking the configuration file corresponding to the first type as the target configuration file if the dial switch is at the first position; taking the configuration file corresponding to the second type as the target configuration file if the dial switch is at the second position.

This technical solution realizes the representation of the memory card identifier through the dial switch, and features a simple and feasible structure and lower circuit cost.

Preferably, the dial switch is electrically connected to a target GPIO pin of a CPU of the intelligent terminal, a high level is output to the target GPIO pin when the dial switch is at the first position, and a low level is output to the target GPIO pin when the dial switch is at the second position;
said identifying a position of the dial switch comprises:
obtaining, by the CPU, a level of the target GPIO pin and obtaining the position of the dial switch according to the level.

Preferably, the first type is an eMMC card, and the second type is a UFS card.

Preferably, said obtaining a target configuration file comprises:
taking the configuration file as the target configuration file if a file name of the configuration file comprises a keyword corresponding to the memory card identifier.

In this technical solution, the target configuration file is inquired according to the file name of the configuration file and the memory card identifier, which improves the inquiring efficiency and accuracy.

Preferably, before said identifying a memory card identifier of the intelligent terminal, the program download method for the intelligent terminal further comprises:
compiling a source program to generate the configuration files respectively corresponding to the types of each of the memory cards, the source program being a single file.

In this technical solution, the source program is a single file, and a plurality of configuration files respectively corresponding to the types of each of the memory cards are generated through compiling. Based on the single source program file, source program maintenance may be facilitated.

The present disclosure further provides an intelligent terminal. The intelligent terminal is provided with a dial switch, and a position of the dial switch is used for representing a type of a memory card of the intelligent terminal for identification.

This technical solution can facilitate the identification of the type of the memory card set by the intelligent terminal by a program download device, such that the corresponding configuration file is downloaded and thereby the intelligent terminal can initialize the memory card and perform read-write access.

Preferably, the type of the memory card of the intelligent terminal is a first type when the dial switch is at a first position, and the type of the memory card of the intelligent terminal is a second type when the dial switch is at a second position.

Preferably, the first type is an eMMC card, and the second type is a UFS card.

Preferably, the dial switch is electrically connected to a target GPIO pin of a CPU of the intelligent terminal, a high level is output to the target GPIO pin when the dial switch is at the first position, and a low level is output to the target GPIO pin when the dial switch is at the second position.

The positive effects of the present disclosure are as follows: in the present disclosure, the type of the memory card of the intelligent terminal can be automatically identified, such that the corresponding target configuration file is automatically obtained according to the type of the memory card so as to configure the intelligent terminal, and thus, the intelligent terminal can normally access the memory card. This solution achieves effective and accurate download configuration and improves the efficiency.

DETAILED DESCRIPTION OF THE PREFERRED EMBODIMENT

The present disclosure is further illustrated by the following embodiments, which are not intended to limit the present disclosure.

Embodiment 1

Figure 1:
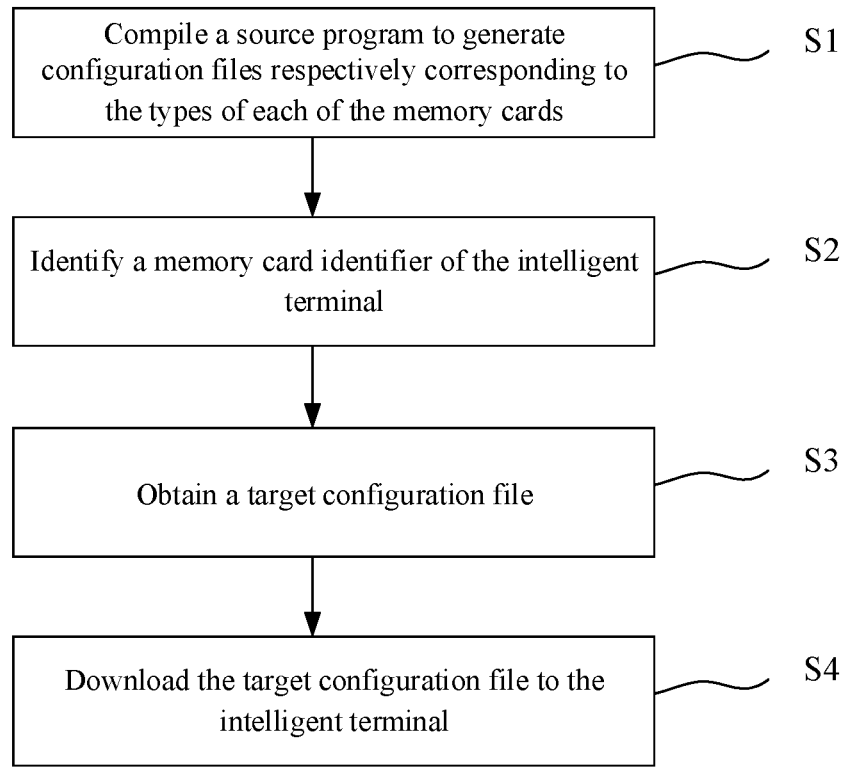
FIG. 1 is a flowchart of a program download method for an intelligent terminal according to Embodiment 1 of the present disclosure.

This embodiment provides a program download method for an intelligent terminal. The program download method for an intelligent terminal is used for downloading a program for the intelligent terminal to enable the intelligent terminal to operate. Referring to FIG. 1, the program download method for an intelligent terminal comprises the following steps:

Step S1, compiling a source program to generate configuration files respectively corresponding to the types of each of the memory cards. In order to be compatible with the types of memory cards that the intelligent terminal may support, the source program contains configuration information for compatibility with the types of memory cards that are needed. In an optional embodiment, the source program contains configuration information for allowing the intelligent terminal to be compatible with an eMMC card (a first type), and the source program further contains configuration information for allowing the intelligent terminal to be compatible with a UFS card (a second type). After the source program is compiled, a first configuration file corresponding to the first type and a second configuration file corresponding to the second type are generated.

The intelligent terminal on the production line is initially a bare machine without software, and the intelligent terminal can normally run only if the software is downloaded to the intelligent terminal. When the software is being downloaded, the intelligent terminal is connected to a program download device. The program download device may be a personal computer (PC) on which the program download tool software is installed. During downloading, the intelligent terminal is set to be in a downloading mode first. In an optional embodiment, the FDL1 program is downloaded first, and the FDL1 program is downloaded to the IRAM (instruction memory). The FDL1 program is a program for initializing a DDR memory (double data rate synchronous dynamic random access memory). After the FDL1 program is downloaded, the central processing unit (CPU) of the intelligent terminal executes the FDL1 program and initializes the DDR memory. The FDL2 program is then downloaded to the DDR memory. The CPU runs the FDL2 program in the DDR memory to execute step S2.

Step S2, identifying a memory card identifier of the intelligent terminal. The memory card identifier is used for representing a type of a memory card of the intelligent terminal. In an optional embodiment, the intelligent terminal is provided with a dial switch, the type of the memory card of the intelligent terminal is a first type when the dial switch is at a first position, and the type of the memory card of the intelligent terminal is a second type when the dial switch is at a second position. Then the CPU executes the FDL2 program in the step S2 to identify the position of the dial switch. Different levels are output to corresponding pins of the CPU when the dial switch is at different positions (for example, the level output to the corresponding pin of the CPU is a high level when the dial switch is at the first position, and the level output to the corresponding pin of the CPU is a low level when the dial switch is at the second position), and the CPU obtains the position of the dial switch according to the level of the corresponding pin. The type of the memory card of the intelligent terminal is a first type if the dial switch is at the first position, and the type of the memory card of the intelligent terminal is a second type if the dial switch is at the second position.

Then, the CPU transmits the memory card identifier corresponding to the type of the memory card of the intelligent terminal to the PC through a data line (such as a USB data line). Next, step S3 is executed.

Step S3, obtaining a target configuration file. The target configuration file is a configuration file corresponding to the memory card identifier. A first configuration file corresponding to the first type and a second configuration file corresponding to the second type are both stored in the PC. The target configuration file can be determined according to a file name of the configuration file and the memory card identifier. The configuration file is taken as the target configuration file if the file name of the configuration file comprises a keyword corresponding to the memory card identifier. Next, step S4 is executed.

Step S4, downloading the target configuration file to the intelligent terminal. The program download tool software of the PC downloads the target configuration file to a program storage area (e.g., flash) of the intelligent terminal.

After the target configuration file is downloaded, the intelligent terminal can be started. After the intelligent terminal is started, the CPU of the intelligent terminal initializes the memory card according to the target configuration file, and then the memory card can be normally accessed.

Based on the program download method for an intelligent terminal in this embodiment, the memory card of the intelligent terminal can be automatically identified, such that the corresponding target configuration file is automatically obtained according to the type of the memory card so as to configure the intelligent terminal, and thus, the intelligent terminal can normally access the memory card. This solution achieves effective and accurate download configuration and improves the efficiency.

In an optional embodiment, the source program is a single file, and a plurality of configuration files respectively corresponding to the types of each of the memory cards are generated through compiling. Based on the single source program file, source program maintenance may be facilitated.

Embodiment 2

Figure 2:
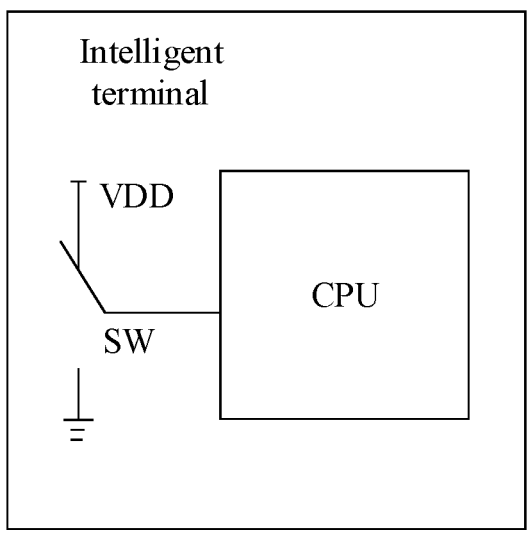
FIG. 2 is a schematic structural diagram of an intelligent terminal according to Embodiment 2 of the present disclosure.

This embodiment provides an intelligent terminal. Referring to FIG. 2, the intelligent terminal is provided with a dial switch SW, and a position of the dial switch is used for representing a type of a memory card of the intelligent terminal for identification.

The dial switch SW is electrically connected to a target GPIO pin of a CPU of the intelligent terminal. When the dial switch is at a first position, a high level is output to the target GPIO pin (the target GPIO pin is connected to a power supply VDD), which represents that the type of the memory card of the intelligent terminal is a first type; when the dial switch is at a second position, a low level is output to the target GPIO pin (the target GPIO pin is grounded), which represents that the type of the memory card of the intelligent terminal is a second type. As an optional embodiment, the first type is an eMMC card, and the second type is a UFS card.

Based on the intelligent terminal of this embodiment, the identification of the type of the memory card set by the intelligent terminal by a program download device can be facilitated, such that the corresponding configuration file is downloaded and thereby the intelligent terminal can initialize the memory card and perform read-write access.

In an optional embodiment, if the memory card set by the intelligent terminal is an eMMC card, the dial switch SW is switched to the first position to represent that the memory card set by the intelligent terminal is an eMMC card.

Then the intelligent terminal is connected to a program download device. The program download device may be a PC on which the program download tool software is installed. During downloading, the intelligent terminal is set to be in a downloading mode first. In an optional embodiment, the FDL1 program is downloaded first, and the FDL1 program is downloaded to the IRAM (instruction memory). The FDL1 program is a program for initializing the DDR memory. After the FDL1 program is downloaded, the CPU executes the FDL1 program and initializes the DDR memory. The FDL2 program is then downloaded to the DDR memory.

The CPU runs the FDL2 program in the DDR memory to identify the memory card identifier of the intelligent terminal. The memory card identifier is used for representing a type of a memory card of the intelligent terminal. If the dial switch SW is at the first position, the level output to the corresponding target GPIO pin of the CPU is a high level, and the position of the dial switch, namely the type of the memory card, can be obtained by the CPU according to the level of the target GPIO pin. The type of the memory card of the intelligent terminal is a first type if the dial switch is at the first position, and the type of the memory card of the intelligent terminal is a second type if the dial switch is at the second position.

Then, the CPU transmits the memory card identifier corresponding to the type of the memory card of the intelligent terminal to the PC through a data line (such as a USB data line).

Then a target configuration file is obtained according to the memory card identifier. The target configuration file is a configuration file corresponding to the memory card identifier. A first configuration file corresponding to the first type and a second configuration file corresponding to the second type are both stored in the PC. The target configuration file can be determined according to a file name of the configuration file and the memory card identifier. The configuration file is taken as the target configuration file if the file name of the configuration file comprises a keyword corresponding to the memory card identifier.

Then the target configuration file is downloaded to the intelligent terminal. The program download tool software of the PC downloads the target configuration file to a program storage area (e.g., flash) of the intelligent terminal.

After the target configuration file is downloaded, the intelligent terminal can be started. After the intelligent terminal is started, the CPU of the intelligent terminal initializes the memory card according to the target configuration file, and then the memory card can be normally accessed.

Although specific embodiments of the present disclosure have been described above, it should be understood by those skilled in the art that these embodiments are merely illustrative and that the protection scope of the present disclosure is defined by the appended claims. Various changes or modifications can be made to these embodiments by those skilled in the art without departing from the principle and spirit of the present disclosure, and such changes and modifications shall fall within the protection scope of the present disclosure.

What is claimed is:

1. A program download method for an intelligent terminal, comprising the following steps:
    identifying a memory card identifier of the intelligent terminal, the memory card identifier being used for representing a type of a memory card of the intelligent terminal;
    obtaining a target configuration file, the target configuration file being a configuration file corresponding to the memory card identifier; and
    downloading the target configuration file to the intelligent terminal;
    said obtaining the target configuration file comprises:
    taking the configuration file as the target configuration file if a file name of the configuration file comprises a keyword corresponding to the memory card identifier.

2. The method according to claim 1, wherein the intelligent terminal is provided with a dial switch, the type of the memory card of the intelligent terminal is a first type when the dial switch is at a first position, and the type of the memory card of the intelligent terminal is a second type when the dial switch is at a second position;
    said identifying the memory card identifier of the intelligent terminal comprises:
    identifying a position of the dial switch;
    said obtaining the target configuration file comprises:
    taking the configuration file corresponding to the first type as the target configuration file if the dial switch is at the first position; taking the configuration file corresponding to the second type as the target configuration file if the dial switch is at the second position.

3. The method according to claim 2, wherein the dial switch is electrically connected to a target GPIO pin of a CPU of the intelligent terminal, a high level is output to the target GPIO pin when the dial switch is at the first position, and a low level is output to the target GPIO pin when the dial switch is at the second position;
    said identifying the position of the dial switch comprises:
    obtaining, by the CPU, a level of the target GPIO pin and obtaining the position of the dial switch according to the level.

4. The method according to claim 2, wherein the first type is an eMMC card, and the second type is a UFS card.

5. The method according to claim 1, wherein before the said identifying the memory card identifier of the intelligent terminal, the method further comprises:
compiling a source program to generate the configuration files respectively corresponding to the types of each of the memory cards, the source program being a single file.

6. An intelligent terminal, wherein the intelligent terminal is provided with a dial switch, and a position of the dial switch is used for representing a type of a memory card of the intelligent terminal for identification;
the type of the memory card of the intelligent terminal is a first type when the dial switch is at a first position, and the type of the memory card of the intelligent terminal is a second type when the dial switch is at a second position;
the intelligent terminal is configured to
identify the position of the dial switch to identify a memory card identifier of the intelligent terminal, the memory card identifier being used for representing a type of a memory card of the intelligent terminal;
obtain a target configuration file, the target configuration file being a configuration file corresponding to the memory card identifier; and
download the target configuration file to the intelligent terminal;
the intelligent terminal is configured to take the configuration file as the target configuration file if a file name of the configuration file comprises a keyword corresponding to the memory card identifier.

7. The intelligent terminal according to claim 6, wherein the first type is an eMMC card, and the second type is a UFS card.

8. The intelligent terminal according to claim 6, wherein the dial switch is electrically connected to a target GPIO pin of a CPU of the intelligent terminal, a high level is output to the target GPIO pin when the dial switch is at the first position, and a low level is output to the target GPIO pin when the dial switch is at the second position.

9. The intelligent terminal according to claim 8, wherein the CPU of the intelligent terminal is configured to obtain a level of the target GPIO pin and obtain the position of the dial switch according to the level.

10. The intelligent terminal according to claim 6, wherein the intelligent terminal is configured to compile a source program to generate the configuration files respectively corresponding to the types of each of the memory cards before identifying the memory card identifier of the intelligent terminal, the source program being a single file.

* * * * *